(12) United States Patent
Copeland

(10) Patent No.: US 10,300,421 B1
(45) Date of Patent: May 28, 2019

(54) DUST COLLECTOR AIR INLET CONTROL SYSTEM

(71) Applicant: Henry Copeland, Montgomery, AL (US)

(72) Inventor: Henry Copeland, Montgomery, AL (US)

( * ) Notice: Subject to any disclaimer, the term of this patent is extended or adjusted under 35 U.S.C. 154(b) by 89 days.

(21) Appl. No.: 15/374,357

(22) Filed: Dec. 9, 2016

Related U.S. Application Data

(60) Provisional application No. 62/294,410, filed on Feb. 12, 2016.

(51) Int. Cl.
| | | |
|---|---|---|
| *B01D 46/00* | (2006.01) | |
| *B01D 46/04* | (2006.01) | |
| *B01D 46/42* | (2006.01) | |

(52) U.S. Cl.
CPC ..... *B01D 46/0087* (2013.01); *B01D 46/0068* (2013.01); *B01D 46/04* (2013.01); *B01D 46/4272* (2013.01)

(58) Field of Classification Search
CPC . B01D 46/00; B01D 46/0067–46/0071; B01D 46/0087; B01D 46/04; B01D 46/4272
USPC ............ 55/282–305, 341.1–341.7, 361–382, 55/418–420; 251/120–122; 137/613–616.7
See application file for complete search history.

(56) References Cited

U.S. PATENT DOCUMENTS 4,360,370 A * 11/1982 McAndrew ........ B01D 46/0067
137/625.38

* cited by examiner

*Primary Examiner* — T. Bennett McKenzie
(74) *Attorney, Agent, or Firm* — Walter A. Rodgers

(57) ABSTRACT

A dust collector includes a pneumatic duct chamber and a bag house interconnected by a valve assembly to provide incremental and varying air pressure within the bag house to prevent damage to the filter bags disposed within the bag house due to sudden changes in air pressure.

14 Claims, 6 Drawing Sheets

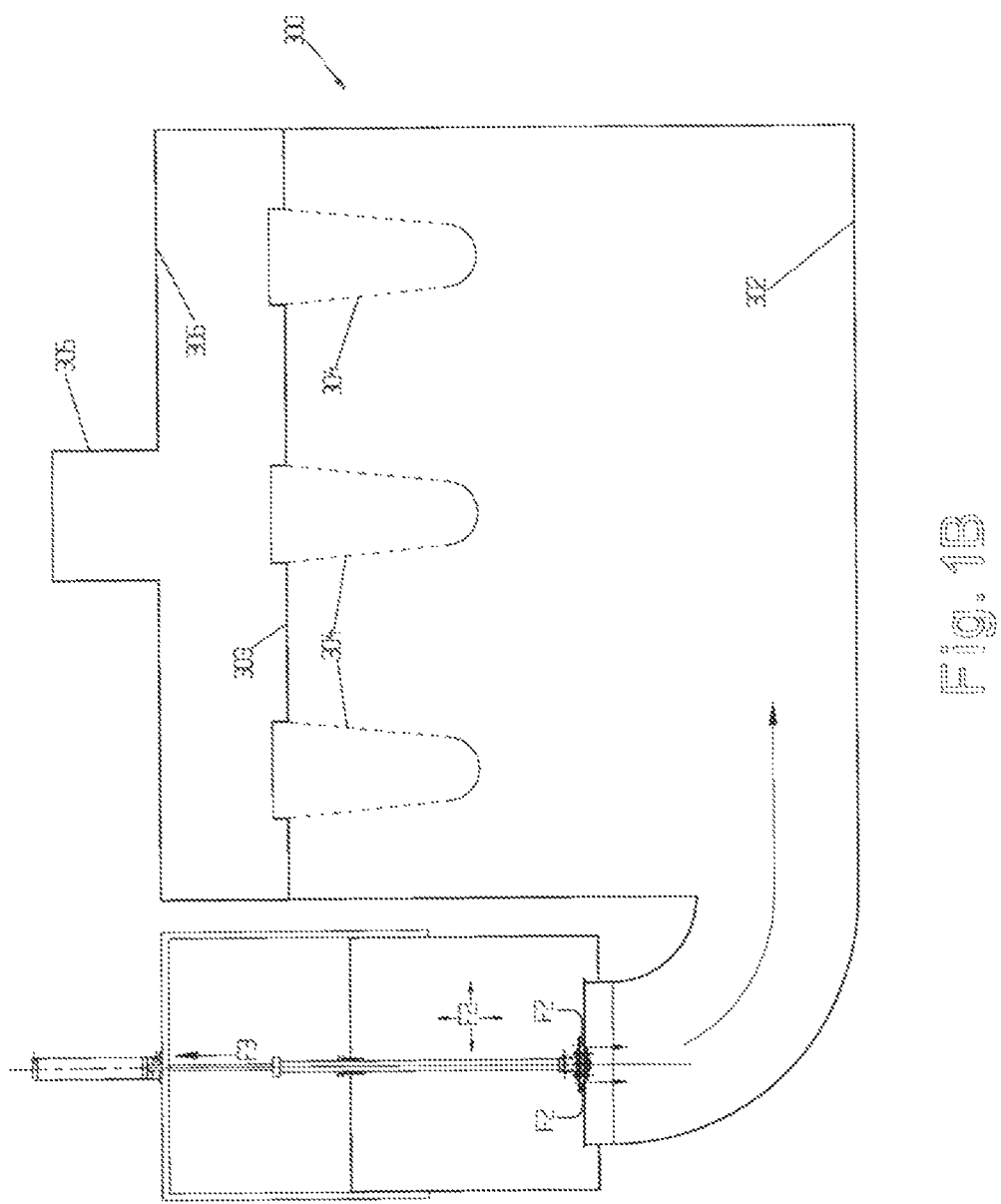

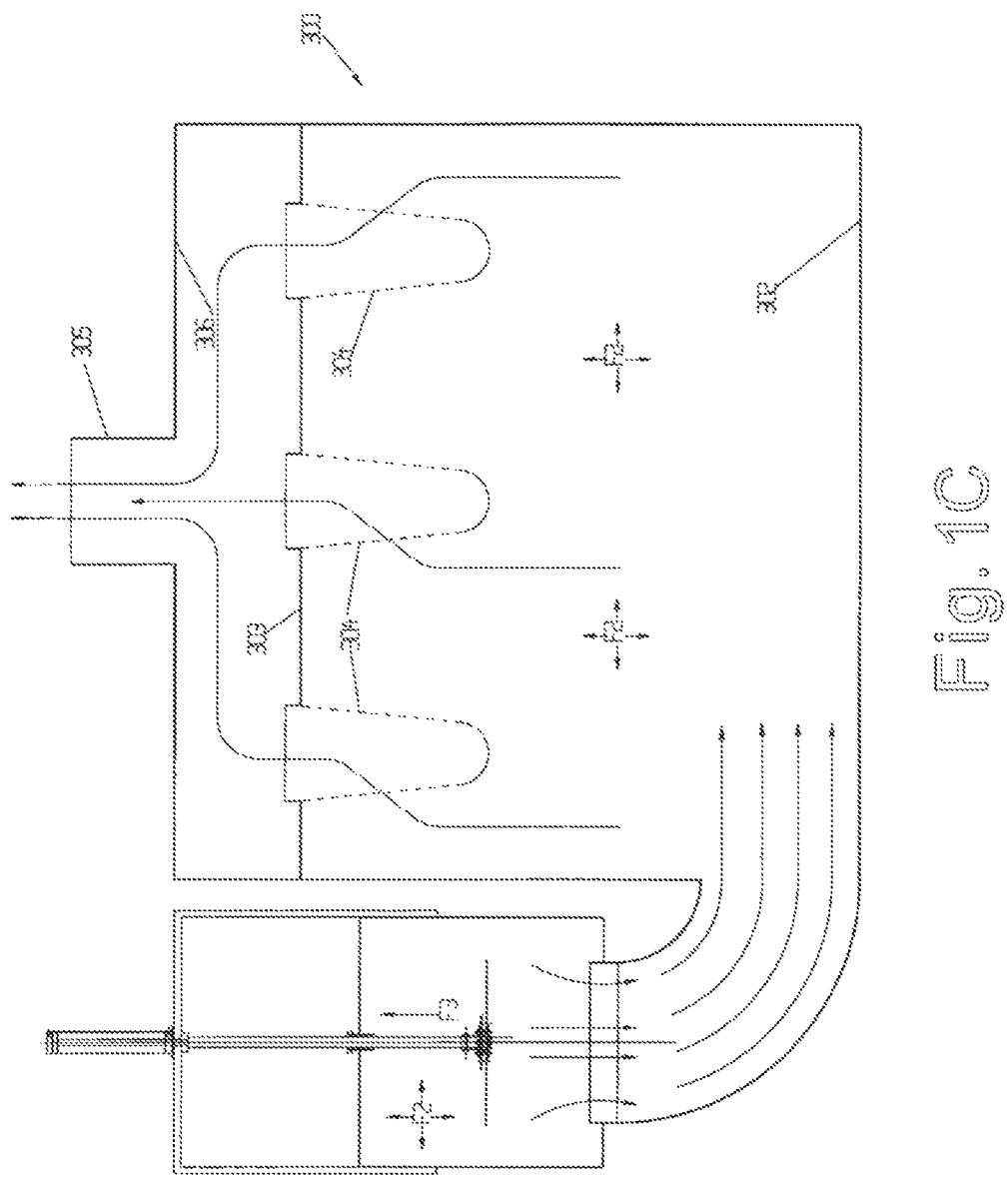

DUST COLLECTOR AIR INLET CONTROL SYSTEM

Domestic priority rights are claimed based on provisional patent application 62/294,410 filed Feb. 12, 2016.

BACKGROUND OF THE INVENTION

This invention is in the field of bag house-type dust collectors and associated air delivery systems. The invention specifically pertains to the control and regulation of the volume of air supplied to a bag house during a cycle of a filtering operation. The cycle comprises the flow of dirty particle bearing air through porous filter medium bags with the resulting deposit of particulate on the outside (entrance) surface of the bags. Periodically air flow through the system is interrupted for the cleaning of particulate from the surface of the bags by means of air blast or shaking for removal of collected particulate from collector compartments. Air flow is then reestablished through system to resume the dust collecting process.

The invention is specifically involved with periodic re-establishment of air flow through the system. During pauses in air flow, the collector bag chamber is brought to near atmospheric pressure. After the bag cleaning process by a secondary system of air blast or shaking, air flow is resumed. In order to protect the bags from air impact damage, air flow and pressure in the system must be reestablished at a steady, incremental and controlled rate.

BRIEF SUMMARY OF THE INVENTION

A dust collector for removing particles from air includes a pneumatic duct chamber and a bag house interconnected to the duct chamber by means of a valve assembly to incrementally vary the air pressure within the bag house. The valve assembly includes a valve disc overlying the portal entry into the bag house with holes formed in the valve disc. A plate overlies the valve disc and a plunger acts to lift the plate away from the valve disc to allow air flow through the holes formed in the valve disc. A lift plate is spaced downwardly away from the valve disc and subsequently causes the valve disc to separate from the portal by means of upward movement of the plunger.

BRIEF DESCRIPTION OF THE SEVERAL VIEWS OF THE DRAWINGS

In the drawings:

FIGS. 1A, 1B and 1C depict cross-sectional views of the dust collector according to this invention;

DETAILED DESCRIPTION OF THE INVENTION

Figure 1A:
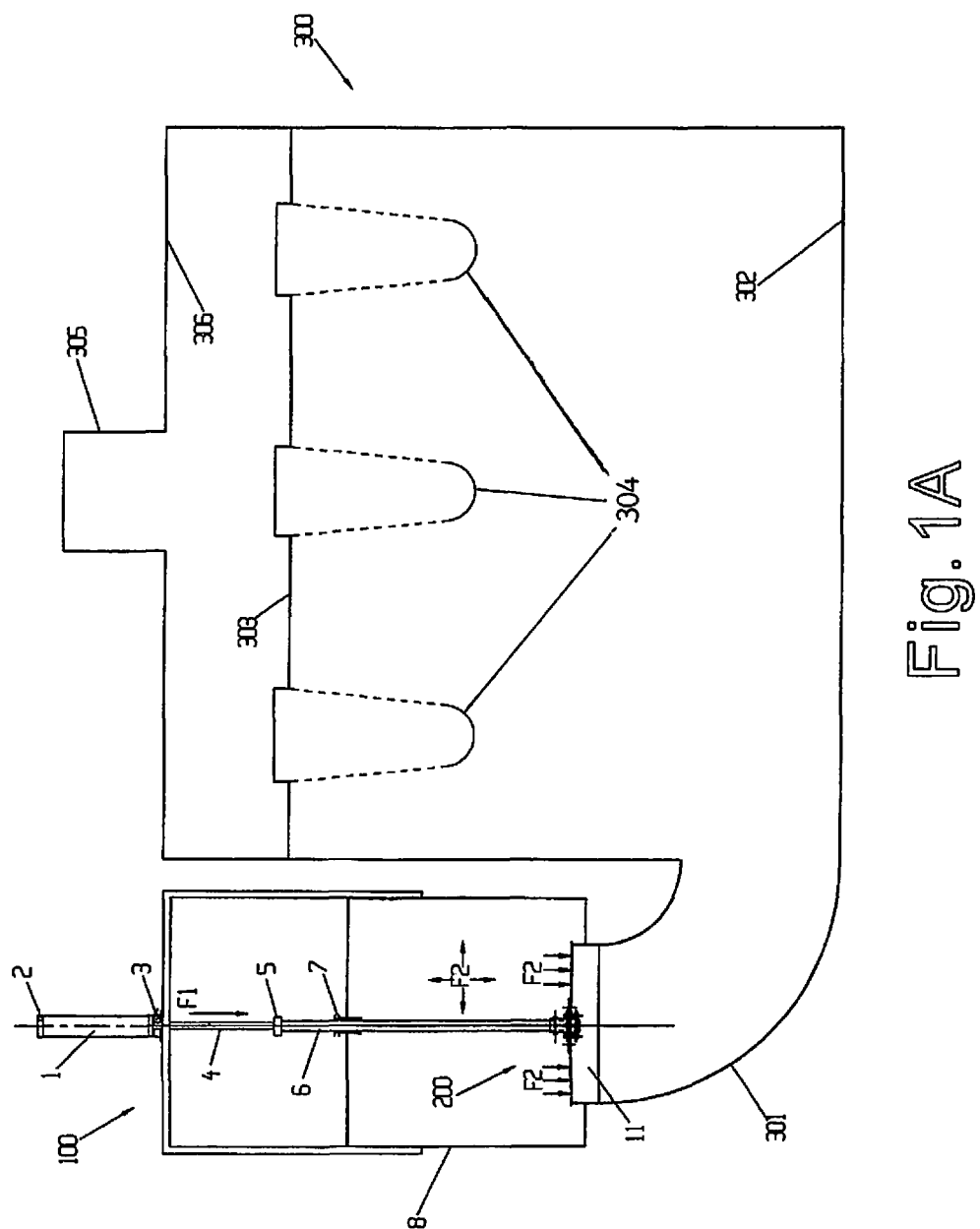

FIGS. 1A, 1B, and 1C illustrate sections of the dust collector including pneumatic duct chamber 100 and valve assembly 200 connected to bag house 300. Bag house 300 is of a type common in the industry and is useful in the extraction of harmful and undesirable particles generated as by-products of certain manufacturing processes such as lead smelting and metal casting. The system includes hydraulic or pneumatic actuator cylinder 1 with cylinder ports 2 and 3, piston and rod 4, coupling 5, plunger 6, airtight packing gland 7, duct body 8, portal 11, connecting ell 301, lower chamber 302, upper chamber 306, cell plate 303, porous medium filter bags 304 and exhaust stack 305. A fan maintains air flow in duct body 8 and effects a rise in pressure F2 within duct chamber 100 above atmospheric pressure.

By this invention, dirty air, carrying harmful and undesirable particles, is forced through filter bags 304 where particles are deposited on the outer surfaces of bags 304. Clean air, now rid of particles, enters upper chamber 306 and is expelled to the atmosphere through exhaust stack 305.

From time to time, in order to remove accumulated particles from the surfaces of filter bags 304, it is required to halt the air flow in the system and depressurize lower chamber 302 to equal that of upper chamber 306.

Certain chambers of this kind, such as dust collector bag house air transfer ducts, contain elements sensitive to rapid pressure reduction. An example of such elements is filter bag 304 in which suspended dust particles are removed from the air by forcing dirty air through fine weave mesh bags 304. Too rapid a change or spike in pressure differential across the filter bag surfaces will cause the bags to split.

FIG. 1A illustrates the structural features of duct body 8 in a pressure sealed condition. Plunger 6 is powered by actuator cylinder 1 to close valve assembly 200 by exerting downward force F1. Valve assembly 200 is thereby held secure against portal 11 effecting a seal of valve disc 209 against portal 11. Lower chamber 302 and upper chamber 306 are then equalized in pressure.

Pressure F2 inside duct body 8 enhances the seal between valve disc 209 and portal 11. In a typical example involving a large dust collector, air pressure induced sealing effect can amount to several hundred pounds of force.

Figure 2A:
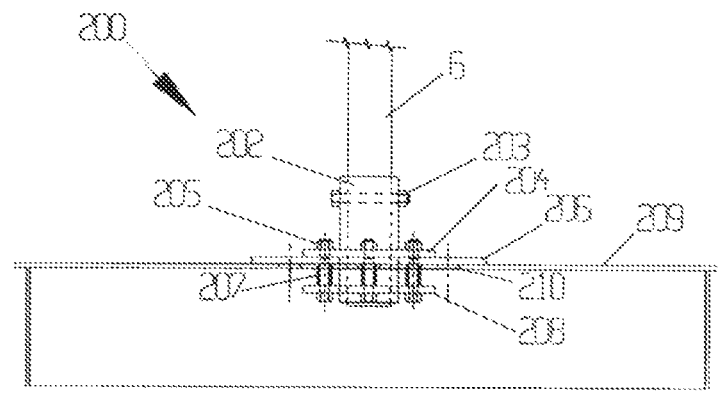
FIGS. 2A, 2B and 2C are cross-sectional views of the valve assembly.
Figure 3A:
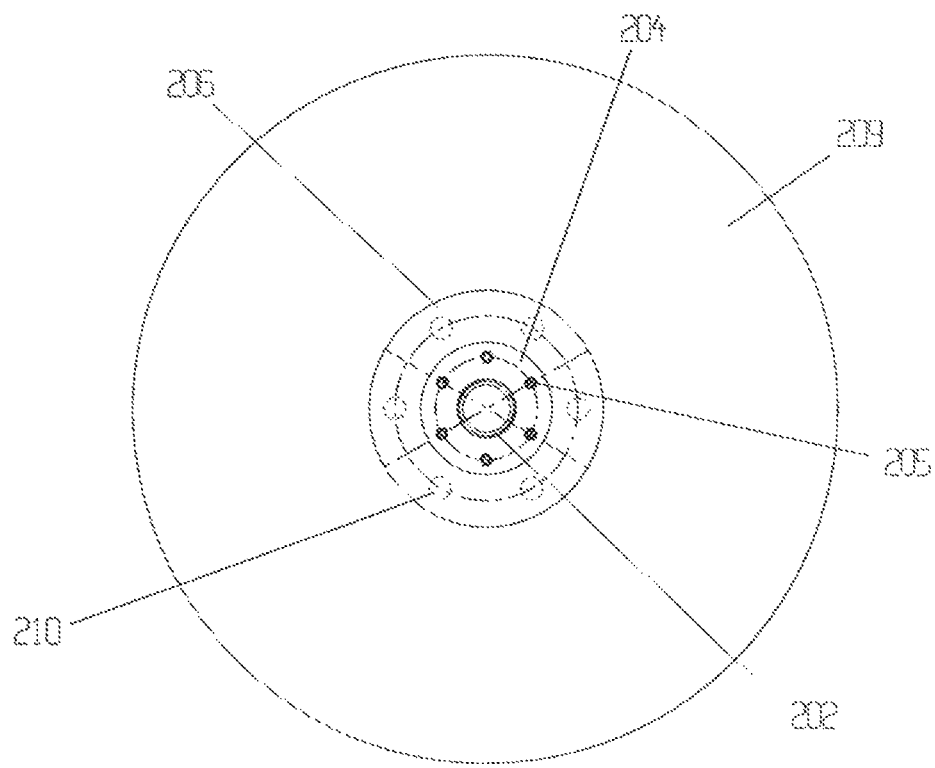
FIGS. 3A, 3B and 3C are plan views of the dust collector valve assembly.

FIG. 2A illustrates valve assembly 200 including sleeve 202 rigidly attached to flange 204 and also attached to plunger 6 by bolt 203. Upper plate 206 is held fast against flange 204 by six bolts 205 extending through respective apertures formed in valve disc 209. Lift plate 208 is captured by bolts 205 and held a certain distance from upper plate 206 by six spacers 207 disposed concentric with bolts 205. The upper surfaces of spacers 207 are in contact with the lower surface of upper plate 206. The apertures formed in valve disc 209 have diameters sufficient to preclude lateral contact with spacers 207. Thus valve disc 209 is captured below upper plate 206 and flange 204 and is free to move sequentially into contact with upper plate 206. A seal is initially effected between plate 206 and valve disc 209 by the closing force of plunger 6 and then by the internal pressure in duct body 8.

FIG. 1B illustrates bag house 300 in a repressurizing condition. Plunger 6 is powered by actuator cylinder 1 to open valve assembly 200. Valve assembly 200 is shifted to pressure relief operation and provides an exit flow path for pressure F2. Valve assembly 200 is relieved of pressure F2 which has an enhanced seal with portal 11.

Figure 2B:
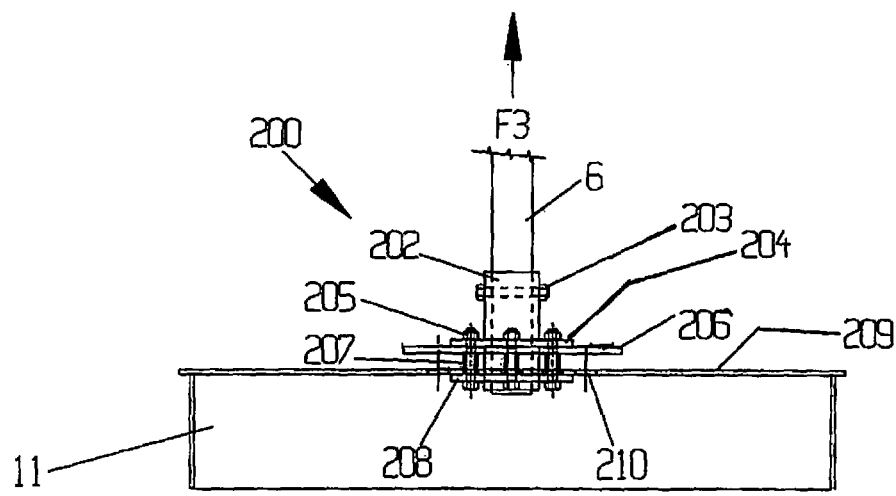
Figure 3B:
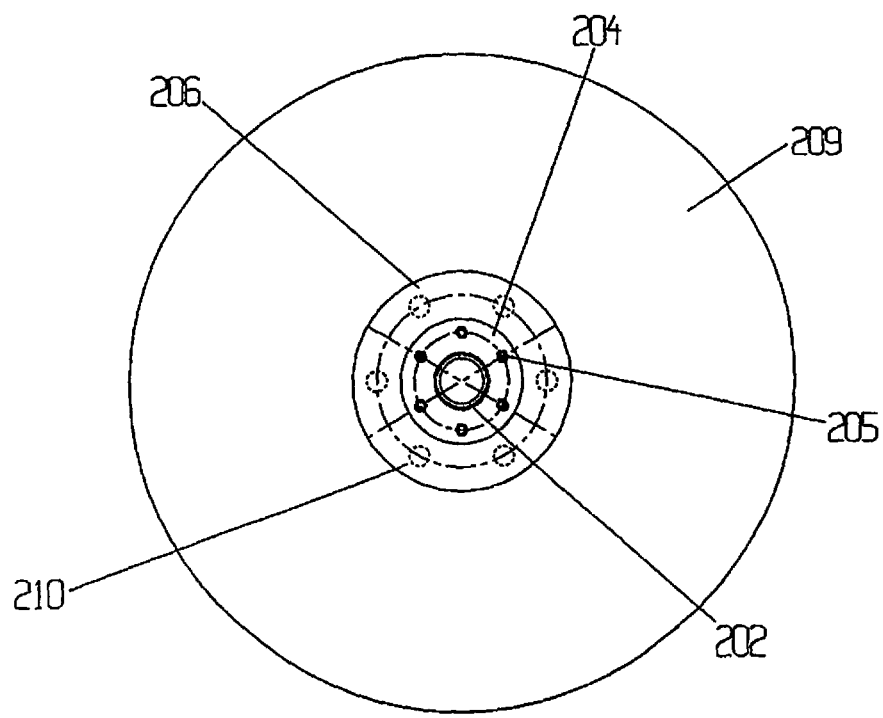

With reference to FIG. 1A and FIG. 2B, the pressure per square inch inside duct body 8 is equal for all surfaces. Hence, in the example shown, the force exerted to break the seal between valve disc 209 and portal 11 is proportional to that required to break the seal between plate 206 and valve disc 209 by the ratio of one area to the other. Valve disc 209 is provided with holes 210 of sufficient number and diameter to allow the desired reduced air flow when plate 206 is raised clear of contact with valve disc 209 by the upward movement of lift plate 208 so that spacers 207 push plate 206 upwardly.

FIG. 2B illustrates the condition where opening force is applied to valve assembly 200 by plunger 6. Since air pressure induced closing force is much greater on valve disc 209 than plate 206, plate 206 first breaks contact with valve disc 209 to provide a secondary passageway and allow desired reduced flow of pressurized air out into bag house 300 through holes 210 thereby protecting filter bags 304 from damage. Valve disc 209 remains held by gravity in contact with portal 11. Forced by plunger 6, valve assembly 200 raises to effect contact of lift plate 208 with valve disc 209.

Figure 2C:
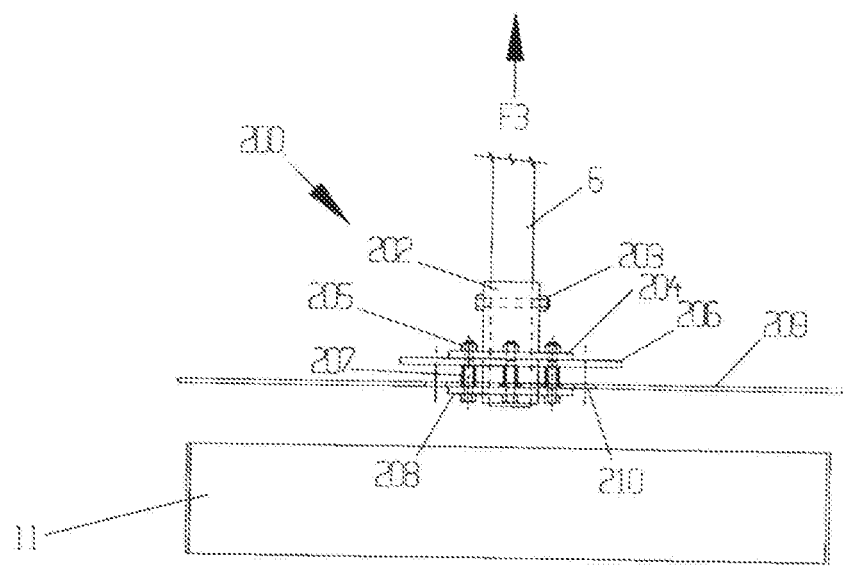
Figure 3C:
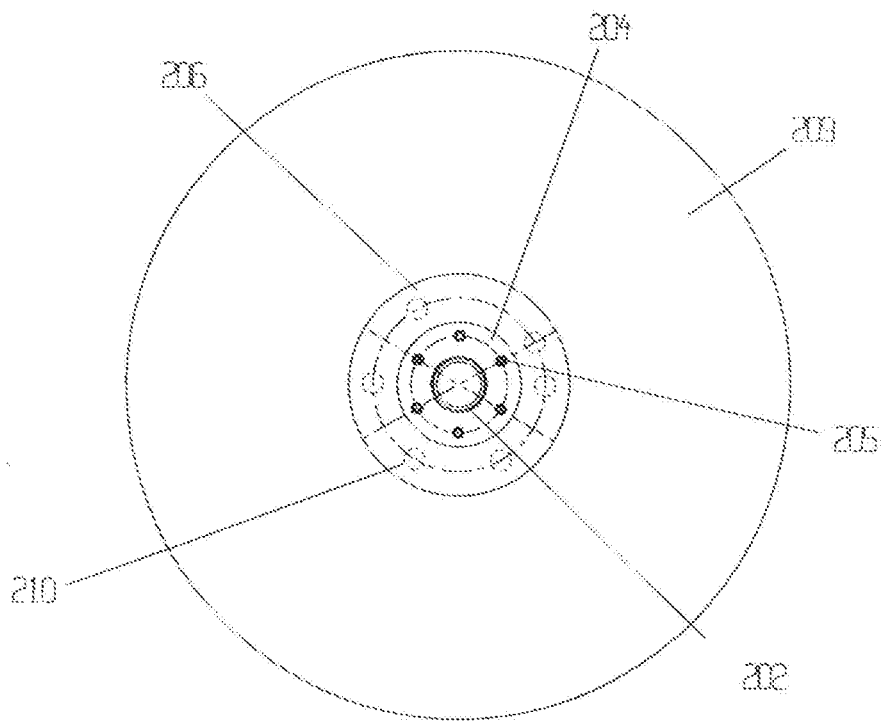

FIGS. 1C and 2C illustrate duct body 8 in an unpressurised condition. Plunger 6 continues to rise and force lift plate 208 into contact with valve disc 209, lifting it and thus effecting a full opening of portal 11 with complete compression of lower chamber 302 and re-established air flow in the system.

In common practice, plunger 1 moves at a fixed rate of motion, opening or closing. Bolts 205 and spacers 207 are provided in selected lengths proportional to the time required to evacuate duct body 8 at the desired rate of decompression. When bolts 205 and spacers 207 of greater lengths are installed, the time lapse prior to contact of rising lift plate 208 with valve disc 209 is increased thereby providing a greater time interval for recompression of lower chamber 302. Decompression rate is also controlled by the adjustment of the size of holes 210.

The invention claimed is:

1. A dust collector comprising a pneumatic duct chamber, a valve assembly, a bag house, said duct chamber having at least one portal of a predetermined size, shape, and location, said valve assembly configured to intermittently control the flow of air into said bag house, said valve assembly comprising an elongated plunger, an open portal, a planar valve disc covering said portal and disposed perpendicular to the axis of said plunger, at least one aperture formed in said valve disc, a lower lift plate disposed below said valve disc, a flange disposed above said valve disc, a sleeve concentric with said plunger and attached to said plunger and secured to said flange, an upper plate disposed between said flange and said valve disc and having a lower surface, said flange and said upper plate being interconnected, at least one spacer separating said lower lift plate and said upper plate and having upper and lower ends, said spacer extending through said aperture formed in said valve disc and being smaller than the diameter of said aperture, said upper end in contact with said lower surface, said lower end in contact with said lower lift plate, said spacer slidable through said aperture, a hole formed in said valve disc, and said hole spaced from said aperture and smaller than the opening of said portal.

2. The dust collector of claim 1 wherein said valve disc is concentrically and movably retained between said upper plate and said lower lift plate, said upper plate contacting and forcing said valve disc against said portal during a closing operation, and said lower lift plate lifting said valve disc during an opening operation.

3. The dust collector of claim 2 wherein said valve disc, when in a closed position, blocks primary air flow and provides a secondary passageway for reduced air flow out of said duct chamber, said secondary passageway comprising said hole, and said hole being sized to allow a restricted rate of air flow out of said duct chamber.

4. The dust collector of claim 3 wherein said secondary passageway is blocked by said upper plate upon complete closure of said valve disc thereby effecting a total blockage of air flow out of said duct chamber.

5. The dust collector of claim 3 wherein said secondary passageway is uncovered and unblocked by said upper plate as it rises during initial incremental opening operation, and a plunger to effect upward lifting of said lift plate.

6. The dust collector of claim 3 wherein the volume of air displaced through second secondary passage is determined by the size of the secondary passage opening.

7. The dust collector of claim 3 wherein the volume of air displaced through the secondary passage is determined by the time interval for secondary passage operation, such time interval being determined by the rate of travel of said upper plate and the degree of separation between said upper plate and said lower lift plate.

8. The dust collector of claim 3 wherein said secondary passageway is blocked by said upper plate upon complete closure of said valve disc thereby effecting a total blockage of air flow by pneumatic duct chamber internal pressure to provide an enhanced sealing force between said valve disc and said portal.

9. The dust collector of claim 3 wherein said secondary passageway, uncovered and unblocked by said upper plate as it rises during initial incremental opening operation, relieves said valve disc of closing force induced by pneumatic internal pressure.

10. The dust collector of claim 3 wherein said secondary passageway is uncovered and unblocked by said upper plate as it rises during initial incremental opening operation to relieve said valve disc of the closing force induced by pneumatic internal pressure and in turn lessens the opening force required to power the valve assembly.

11. A valve assembly comprising an elongated plunger, an open portal, a planar valve disc covering said portal and disposed perpendicular to the axis of said plunger, at least one aperture formed in said valve disc, a lower lift plate disposed below said valve disc, a flange disposed above said valve disc, a sleeve concentric with said plunger and attached to said plunger and secured to said flange, an upper plate disposed between said flange and said valve disc and having a lower surface, said flange and said upper plate being interconnected, at least one spacer separating said lower lift plate and said upper plate and having upper and lower ends, said spacer extending through said aperture formed in said valve disc and being smaller than the diameter of said aperture, said upper end in contact with said lower surface, said lower end in contact with said lower lift plate, said spacer slidable through said aperture, a hole formed in said valve disc, and said hole spaced from said aperture and smaller than the opening of said portal.

12. The valve assembly of claim 11 wherein a bolt extends through said spacer and interconnects said flange, said upper plate, and said lower lift plate.

13. The valve assembly of claim 12 wherein the length of said bolt is variable.

14. The valve assembly of claim 11 wherein said spacer is of a selected length proportional to the linear movement of said plunger.

* * * * *